Aug. 24, 1926.
C. L. FORTIER
1,597,351
CONTROL SYSTEM FOR TEMPERATURE, HUMIDITY, AND THE LIKE
Filed Feb. 16, 1925    2 Sheets-Sheet 2
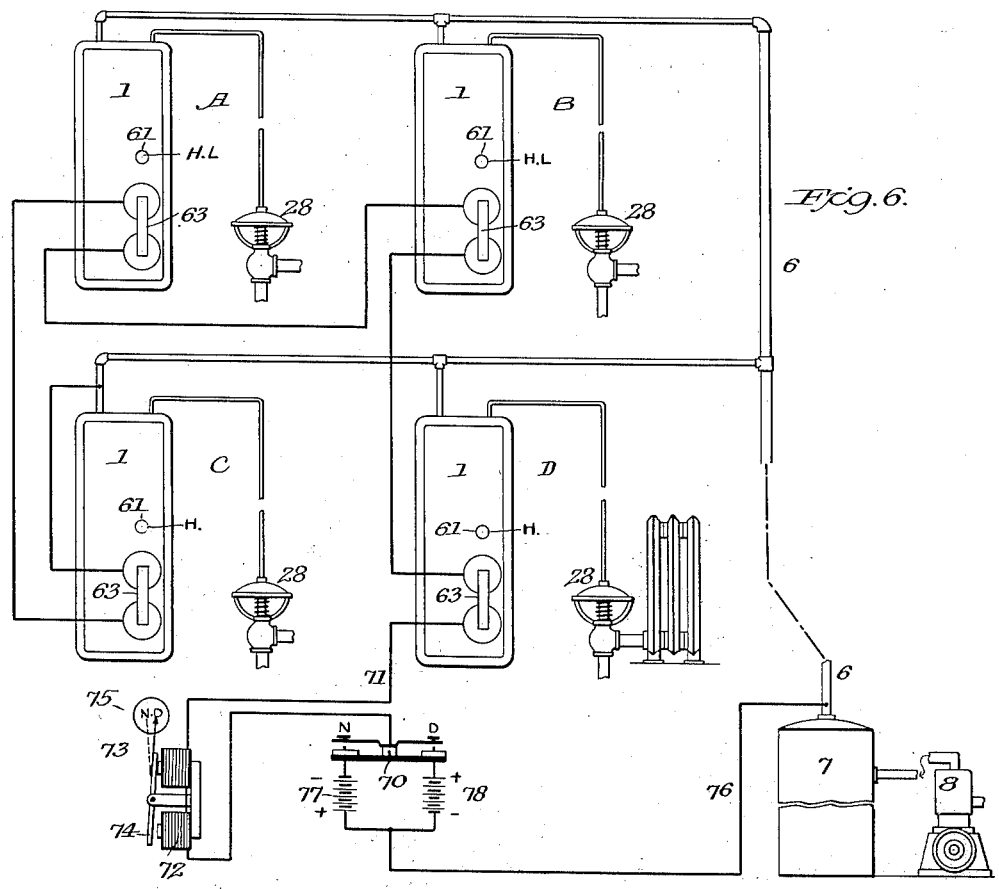
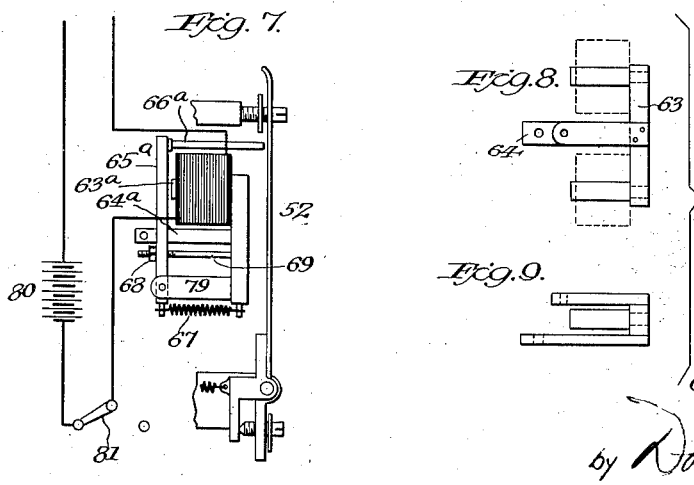

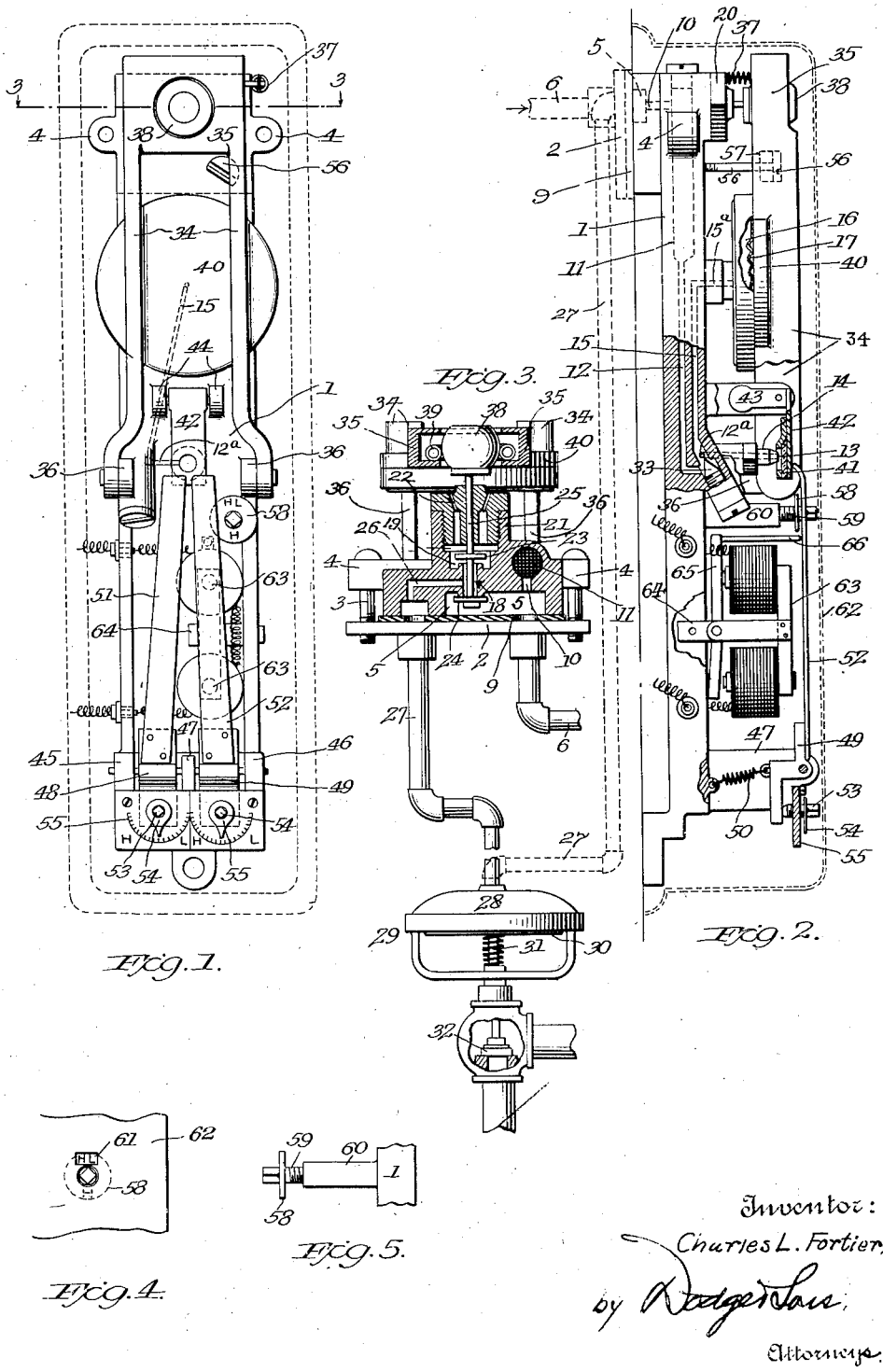

Patented Aug. 24, 1926.

1,597,351

UNITED STATES PATENT OFFICE.

CHARLES L. FORTIER, OF MILWAUKEE, WISCONSIN, ASSIGNOR TO JOHNSON SERVICE COMPANY, OF MILWAUKEE, WISCONSIN, A CORPORATION OF WISCONSIN.

CONTROL SYSTEM FOR TEMPERATURE, HUMIDITY, AND THE LIKE.

Application filed February 16, 1925. Serial No. 9,675.

This invention relates to control systems of the compressed-air type responsive to atmospheric changes, and particularly changes in temperature or in humidity. The apparatus will be here shown and described as applied to temperature control, but it is to be understood that except for the substitution of a hygroscopic substance or device for a thermostatic device, the apparatus employed for temperature control is equally applicable to humidity control.

The purpose of the invention is to afford a simple method and means of controlling from a central point the action of the responsive devices in selected rooms or spaces in a building, so that heat, moisture, or the like agent, may be supplied to, varied in, or cut off from such rooms or spaces at will, while held at a normal or predetermined point in others through automatic means.

A temperature of 70 degrees Fahrenheit is now generally adopted as the normal or usual daytime temperature in school rooms, offices, hotels, and the like, and it is customary to carry in the conduits of control systems such as here described, a pressure of 15 pounds per square inch, and though a different temperature, or different pressure, or both, may be adopted, those just named will be assumed in the following description to be the normal temperature and pressure figures.

In such buildings it is customary as a matter of economy, to cut off the heat, or to maintain a lower temperature during the night, or at such times as the rooms are unoccupied, or both. It is of course desirable to be able to control from a central point the action of thermostats, humidostats, or other devices, in those rooms which are to be temporarily out of normal automatic control. This has heretofore been accomplished by changing the air pressure in the main pipe of the control system, with a consequent shifting of devices which in turn throw the thermostatic or humidostatic devices into and out of normal control action. It has also been accomplished through employment of an electric current to actuate a device at each thermostat, humidostat, or the like, for the same purpose, said electric devices being severally wired to a central point and under control of manually operated individual switches at that point. In a building having a large number of thermostatically or humidostatically controlled rooms, such a system would necessitate the installation of a quite large and expensive wiring system, and it is the purpose of the present invention to provide a method and means which will simplify, improve, and lessen the cost of such an electrically-operated control system, as compared with prior plans.

The invention is susceptible of embodiment in somewhat varied form, a simple and preferred type being illustrated in the accompanying drawings, equipped with thermostats for the control of temperature. In these drawings:

Figure 1 is a front view of a thermostat suitable for use in carrying out my invention;

Fig. 2, a side elevation of the same partly in section and with portions broken away;

Fig. 3, a horizontal section on the line 3—3 of Fig. 1, looking downward;

Figs. 4 and 5, end and side elevations of a selector stop and indicator for holding out of action one of the two thermostatic elements with which each thermostat is provided;

Fig. 6, a diagram illustrating my invention as applied to a group or series of heat-control devices, the parts being indicated more or less conventionally and without regard to actual proportions;

Fig. 7, a modification of the electromagnetic element of Fig. 1;

Figs. 8 and 9, respectively side elevation and top plan view of the electromagnet shown in Figs. 1, 2 and 6, the winding of the coils being indicated in dotted lines in Fig. 8 and omitted in Fig. 9.

To make clear the construction of the apparatus under the preferred embodiment of the invention here illustrated, I will first describe the thermostat in connection with Figs. 1 to 5 inclusive, and thereafter set out in connection with Fig. 6, the operation of the same in connection with the central control devices.

The thermostat comprises a main body 1 bracketed out at its upper and lower ends to hold said body away from the wall to which the instrument is secured. As shown in Fig. 3, a wall-plate 2 is set in the wall and has tapped holes to receive holding screws 3 which pass through lugs 4 at the upper and lower ends of the body 1. Said body is formed with an air chamber 5 in its rear face, to receive air from a main air-supply pipe 6, which pipe receives compressed air from a tank 7, the tank being charged with air compressed to and maintained at a pressure of 15 pounds above the normal atmospheric pressure by means of a suitable air pump or compressor 8. The rear wall of air chamber 5 is formed by the wall-plate 2, and is made air-tight by an interposed gasket 9. Opening from chamber 5 is a passage 10 communicating with a filter chamber 11, which is in practice charged with wool or like material to act as a filtering medium, said filter chamber in turn communicating by passage 12—12ª with a leak-port 13 formed in a nozzle 14 projecting from the front face of body 1. The passage 12 is continued beyond the inner end of leak-port passage 13 by a passage 15—15ª opening into the interior of an expansion chamber formed in a shell or casing 16 having a flexible outer wall or diaphragm 17, preferably corrugated to afford greater flexibility.

The air chamber 5 further communicates by a passage 18 with a chamber 19, the outer wall of which is formed by a center piece 20 screwed into a neck or collar 21 projecting from the outer face of body 1. Center piece 20 is provided with one or more vents 22, through which air escaping into chamber 19 may pass to the atmosphere. The passage 18 is formed with seats at its opposite ends for disks or valves 23, 24, carried by a stem 25 passing through a central hole or guideway in the center piece 20. The disks 23 and 24 are spaced apart a distance slightly greater than the length of passage 18, so that as either valve seats the other will unseat. When valve 24 seats it seals the chamber 5 against escape of air, but when said valve unseats and valve 23 seats, communication is established between passage 18 and a branch passage 26 opening therefrom at about the midlength of passage 18, said passage 26 communicating by a pipe 27 with the expansion chamber 28 of a motor 29, the flexible wall or diaphragm 30 of which is connected with or bears upon the stem 31 of a heat-control valve 32. When communication between air chamber 5 and chamber 19 is thus closed by the seating of valve 23 and unseating of valve 24, communication is established between chamber 5 and expansion chamber 28 of motor 29 through pipe 27, admitting air under pressure into said expansion chamber and causing the seating of valve 32. When the positions of valves 23 and 24 are reversed, air escapes to the atmosphere from expansion chamber 28 of motor 29 by way of pipe 27, passage 26, passage 18 and vent 22. Communication between air chamber 5, leak-port 13, and expansion chamber 16, is, under certain temperature conditions, open to the atmosphere by way of passages 12—12ª, 15—15ª and said leak-port. A needle valve 33 controls the passages 12—12ª, 15—15ª, at the junction of the two sections, so that the vent afforded by the leak-port when the same is open is sufficient to prevent the building up of pressure in the expansion chamber 16 of the thermostat.

The double valve 23, 24 is brought into action by the thermostat on a very slight change of temperature either above or below the normal, and to insure this it is important that said valve be quickly thrown when such small change occurs. For this purpose there is provided a swinging saucer frame, comprising two legs 34 connected at their upper ends by a box-like structure 35, the lower extremities of the legs 34 being pivotally attached to lugs 36 projecting from the front of body 1, and the upper extremities being drawn inwardly by spring 37 connected to said body and to the box-like portion 35. The front and rear walls of the box 35 are perforated to permit passage through them of a substantially spherical head 38 carried by the stem 25 of the double valve. Within the box 35, encompassing the spherical head 38, and slightly tensioned, is a helical spring 39 bent into circular form, and having its two ends connected to produce an annular contractile spring. Owing to the tension of said spring or its tendency to contract, it will whenever pressed from one side of the mid-zone of head 38 to a point just beyond such mid-zone, move automatically toward the proximate wall of box 35, and still contracting, will force the spherical head 38 and consequently valve stem 25 and valves 23, 24, in a direction away from spring 39. As a consequence, when said spring lies against the inner wall of box 35, spherical head 38, valve stem 25, and valves 23, 24 will be moved outward by the contraction of the spring, valve 24 seating against the inner end of passage 18, and valve 23 unseating from the outer end thereof. When said spring 39 lies against the outer wall of box 35, the movement of the spherical head, valve stem, and valves 23, 24 will be reversed.

To effect the outward movement of the saucer-frame it is provided with a saucer 40 which faces and bears against the diaphragm 17, so that when air pressure builds up in expansion chamber 16 and said diaphragm is caused to bulge outward, it will force the frame and its head 35 outward against the tension of spring 37, but when the pressure within said expansion chamber is relieved through the unsealing of leak-port 13, diaphragm 17 will resume its normal shape, and the saucer-frame will be drawn inward by contraction of spring 37. To automatically seal and unseal leak-port 13 in response to rise and fall of temperature in the surrounding medium, there is provided a valve or pad 41 preferably of celluloid, though it may be of patent leather or other suitable material. This valve is held in a plate or carrier 42 attached at its upper end to a weighted arm 43, fulcrumed between two arms or lugs 44, the weight of arm 43 being sufficient to swing carrier 42 outward, and to move valve or pad 41 away from the end of leak-port nozzle 14, thus unsealing the leak-port.

Projecting outward from the lower portion of the body 1 of the thermostat, are three arms 45, 46, 47, between which are pivoted two saddles 48 and 49. The form of these saddles will be seen upon referring to Fig. 2, where the saddle 49 is shown in side elevation. Each saddle consists of an arm extending above its pivot, a second arm extending downward below the pivot, and a short intermediate portion by which the two arms are thrown out of plane. Each saddle is connected at about its midlength with the body 1 by a tensioned coiled spring 50. The saddle 48 carries a thermal strip or element 51, and saddle 49 carries a similar thermal element 52. These are of like structure, preferably of two thin strips of metal having different co-efficients of expansion, laid face to face, and firmly united in any usual or convenient way. The upper ends of the strips 51, 52 are slightly separated at their proximate edges, and both overlap or bear against the lower end of the depending pad-carrier 42, as seen in Fig. 1.

The lower arm of each saddle is by the pull of spring 50 caused to bear against an adjusting screw 53 provided with a pointer 54 movable over a graduated dial 55 to determine the initial position or adjustment of the thermostatic strips 51, 52. Each pointer indicates on the scale the degree of temperature at which the upper and inwardly bent end of the thermal strip with which it is associated, shall press the valve 41 into sealing contact with leak-port nozzle 14, the strips 51, 52 being mounted with the more expansible element on the outer side so that the strips shall curve or warp inward on rise of temperature and outward on fall of temperature. Strip 51 is designed to maintain a constant predetermined temperature, usually 70 degrees Fahr., in the room or space in which the thermostat is located; hence its adjusting screw is usually set at 70 degrees to cause the closing of leak-port 13 when that temperature is reached. Such closing of the leak-port causes pressure to build up in expansion chamber 16, forcing out diaphragm 17, which in turn swings the saucer-frame outward, thereby carrying the annular spring 39 outward past the mid-zone of spherical head 38, and causing the quick inward movement of said head, valve stem 25, and valves 23, 24. This inward movement of the valves as above pointed out, seals the outer end of passage 18 preventing any escape of air to chamber 19 and vents 22, and opens communication between air chamber 5 by way of passages 18 and 26, through pipe 27 and to expansion chamber 28 of motor 29, causing the outward movement or bulging of diaphragm 30 and the seating of heat-supply valve 32, thus cutting off heat from the room or space in which the thermostat is located.

This is the ordinary construction and operation of the thermostat of the well-known Johnson system of temperature control.

The outward throw of the saucer-frame is limited and determined by a screw 56 threaded to fit a hole tapped in the face of body 1, and having a head cut away at one side so that the opposite side may be turned into or out of a recess 57 in a side wall of the saucer-frame. The depth to which the stem is screwed into its socket determines the limiting position of the screw-head, and the cut-away portion permits the head to be turned to such position as will free the saucer-frame and permit it to be swung outward to any desired extent for adjustment or replacement of parts.

Thermal strip 52 has associated with it a stop-disk 58 carried by a threaded stem 59 having a polygonal end to permit it to be turned by a suitable implement, so as to move disk 58 nearer to or further from the front of body 1 as stem 59 is screwed into or out of a tapped post 60 projecting from said body. Disk 58 bears suitable indicia, as the letters "H L" and the letter "H", at diametrically opposite points on said disk, and the pitch of the screw thread is such that a half turn will not only bring one or the other indication opposite a window 61 in the shell or cover 62 shown in Fig. 4 and indicated by dotted lines in Figs. 1 and 2, but will also carry said disk to or from arresting position for the thermal member 52. When moved outward to its arresting position, the edge of disk 58 lying in the path of swing or movement of strip 52 will preclude the latter from forcing pad 41 into sealing contact with leak-port nozzle 14, and will leave the instrument under control of thermal strip 51; in other words, in condition to maintain automatically and constantly the predetermined normal temperature in the room or apartment. Under such adjustment of screw 59 the letter "H" will appear at window 61, indicating that the instrument is adjusted for the higher or normal daytime temperature. If the adjustment be such as to carry disk 58 inward beyond its arresting position, the letters "H L" will be displayed at window 61, and strip 52 will be left free to swing inward and to press pad 41 into sealing relation to the leak-port 13 of nozzle 14. As the adjusting screw 53 for saddle 49 and strip 52 is adjusted to cause strip 52 when not prevented by disk 58, to seal said leak-port at a relatively low temperature as compared with strip 51, said strip 52 will close leak-port 13 and bring about a closure of heat-supply valve 32 at such lower temperature.

To permit the thermal strip 52 of any instrument to be thrown out of action by the person in charge of the heating plant, each instrument is provided with electrical means by which the thermal strip 52 of a selected instrument, or selected instruments may be thrown out of action or precluded from sealing the leak-port, through manipulation of a control switch at a central control point. This mechanism is illustrated in Figs. 1, 2, 6, 8 and 9, and in a modified form in Fig. 7.

As seen in Figs. 1 and 2, a U-shaped electromagnet 63 is mounted in an arm or bracket 64 projecting from the front of the body 1, which bracket may conveniently be secured to one of the vertical ribs formed on said body. Pivotally mounted in bracket 64 is a polarized armature 65 of hardened steel, the poles of which are opposed to and at a short distance from the poles of the electromagnet, so that by reversing the flow of current through the spools or windings of the electromagnet poles and thereby reversing the polarity of said magnet, the positive pole of armature 65, or the negative pole, may at will be attracted, and the opposite pole repelled by the electromagnet, since dissimilar poles attract and similar poles repel. The upper end of armature 65 is provided with a horizontally projecting rod or pin 66, which when the upper pole of the armature is attracted and the lower repelled, moves outward a distance sufficient to force and hold back thermal strip 52, and to permit the weighted arm 43 to swing pad 41 away from and out of sealing contact with leak-port nozzle 14. In this way leak-port 13 will be unsealed and opened, diaphragm 17 of expansion chamber 16 will collapse, and the saucer-frame will be drawn inward by contraction of spring 37, resulting as explained in an outward movement of valve stem 25, the cutting off of communication between the main air-pipe 6 and motor 29, the venting of said motor, and the consequent opening of heat-supply valve 32. In other words, the instrument will be placed under control of thermal strip 51. If the current of electromagnet 63 be reversed, armature 65 will be moved in the opposite direction, pin 66 will be withdrawn from contact with thermal strip 52, and said strip will be placed in control of the instrument. The polarized armature will adhere to the pole by which it is last attracted by reason of its own permanent magnetism, until the polarity of the electromagnet is reversed.

In Fig. 7 the electromagnet 63ª is shown of single spool or single core type, and the armature 65ª is shown pivoted near its lower end and provided with a tensioned spring 67 tending to move the upper end of armature 65ª, which carries a rod or pin 66ª similar to pin 66 of Fig. 2, away from the thermal strip 52, so that when the magnet 63ª is not energized pin 66ª will be withdrawn from the thermal strip. A stop-nut 68 carried by a threaded stem 69 serves to limit the movement of armature 65ª away from the electromagnet. In all other respects the construction of the apparatus is the same as previously described, but the movement of the armature in one direction is due to the attraction of the electromagnet, and occurs and continues when and so long as the magnet remains energized, while the movement in the reverse direction is effected by spring 67, and the armature is held away from the magnet pole so long as the magnet remains de-energized.

The electromagnets 63 of the various instruments are included in an electric circuit shown diagrammatically in Fig. 6, and illustrating the complete apparatus as installed for the control of temperature in four rooms designated as A, B, C and D. As indicated by the letters "H L", the stop-disks 58 in rooms A and B are turned inward, placing thermal strips 52 under control of pins 66 or 66ª, and exposing said letters through window 61 or cover 62, denoting that the instruments are set for higher and lower temperatures. In schools, for instance, such settings of stop-disks 58 are made at the beginning of the term, and are not altered unless a change is desired in the use of the rooms. In rooms C and D which are to be supplied with normal temperature day and night, stop-disks 58 are turned outward exposing the letter "H" through window 61, forcing outward thermal strip 52, thus freeing the pad-carrier 42 and permitting it to swing away from nozzle 14 through the action of weighted arm 43, and venting leak-port 13. This adjustment relieves the instrument from the control of thermal strip 52 and places it under control of strip 51, which will cause the temperature to be maintained at the predetermined normal,—70 degrees Fahr., the letter "H" which is displayed at the window 61 denoting that the device is set for higher temperatures.

The numeral 70, Fig. 6, designates a two-button switch with which is connected a wire or conductor 71 passing first to the electromagnet 72 of an indicator 73 located in proximity to switch 70, and having its armature 74 provided with a pointer movable to either of the letters "N" and "D" appearing on a target or fixed card 75, and serving to indicate by its position that the instruments are adjusted either for night or for day temperature as the case may be; in other words, giving evidence as to the latest adjustment made. From the magnet 72 line 71 continues to the several magnets 63 of the instruments in rooms D, B, A, C, and finally to the main air-supply pipe 6 which through proper branches extends to the thermostats 1 of each of the several rooms. A second wire or conductor 76 connects main air-supply pipe 6 with the positive pole of a battery 77 and with the negative pole of a battery 78, the first of which may be brought into circuit with the line 71 by pressure upon the night button "N", and the second of which may be brought into circuit with said line 71 through pressure upon the day button "D".

The flow of current through the circuit and through the magnet windings will be in one direction when the button "N" is pressed, and in the opposite or reverse direction when the button "D" is pressed, and the magnets 63 will be caused to move their armatures in a direction to force thermal strips 52 away from pad or valve carrier 42, or to permit it to move toward and swing said carrier inward to effect closure or sealing of leak-port 13 of those instruments in which the stop-disks 58 are not adjusted to their outward positions. A movement of the armature in a direction to force its pin against strip 52 will press and hold said strip away from the nozzle 14 in rooms A and B, while the instruments of rooms C and D being already held off by the outward adjustment of their stop-disks 58, will be unaffected. When the magnet currents are next reversed, the pins 66 or 66ª will be withdrawn, and the pads or valves 41 of the instruments in rooms A and B will be freed and will move inward, sealing the leak-ports of the instruments in said rooms and effecting a cutting off of the heat through closure of heat-supply valve 32 at a relatively low temperature. The instruments in rooms C and D will continue to maintain the predetermined normal or daytime temperature owing to the stop-disks 58 of said instruments being at their outer adjustment, thus precluding their thermal strips 52 from sealing the leak-ports 13, and leaving the instruments in rooms C and D under the control of the thermal strips 51.

It will thus be seen that by merely pressing upon one or the other of the buttons "N" and "D" (Fig. 6) at the central or control point, all instruments in which the stop-disks 58 are at their inner adjustment may be instantaneously placed under control of the thermal strips 52 or returned to the control of the strips 51, and that this is done by a very simple system of wiring extending to the electromagnets of the various rooms in series, and returning or completed by the main air-supply pipe 6 and its branches. This avoids entirely the use of a separate and distinct circuit and circuit-closer for each room, and requires the closing of the circuit for a moment only in making the change from continued normal daytime temperature to alternate daytime and night time temperature. It also avoids the use of pawls, ratchets, and other intermediate mechanical devices for bringing into and out of action the thermal strip 52.

While I have shown and described batteries to supply the necessary current, it is obvious that connection may be made with the ordinary electric light circuits with which most modern buildings are equipped. The current consumption in either case is very small.

Figs. 8 and 9 show in side elevation and in top plan the bracket or support 64 for the magnet 62 of U-form illustrated in Figs. 1 and 2 and shown diagrammatically in Fig. 6, the windings being indicated in dotted lines in Fig. 8. The magnet 63ª of Fig. 7 having but one bobbin or spool and one effective pole, has a similar bracket 64ª except that it is a single instead of a double-armed member. Instead of the second pole-piece shown in Fig. 8, Fig. 7 provides a double or forked arm 79 to form a pivot support for the armature 65ª. Except for this and for the use of a single battery 80 and a simple circuit making and breaking switch 81, the construction illustrated in Fig. 7 is generally similar to that of the other figures.

Different forms of electromagnet are of course available, among others a solenoid or tubular coil into which the pin 66, in such case made of iron, may be drawn, or from which it may be moved outward upon the passage of current through the coil in one or the other direction.

I claim:—

1. In a control system of the character described, the combination of a pressure-fluid conduit communicating with a plurality of rooms; a plurality of control instruments, one for each room in which control is to be effected, each such instrument communicating with the pressure-fluid system and provided with a leak-port and a valve for closing the leak-port, and with two like elements responsive to atmospheric changes, both such elements adapted to effect the seating and unseating of said valve in response to atmospheric changes; means whereby one of said elements of each instrument may at will be held out of or permitted to go into operative relation with the leak-port valve; an electromagnet associated with the last-mentioned responsive element of each instrument and serving, when energized, to move and hold said element out of valve-closing action; an electric circuit including the electromagnets of the several instruments; and means for momentarily completing the electric circuit to temporarily energize said electromagnets.

2. In a control system of the character described, the combination of a pressure-fluid conduit communicating with a plurality of rooms; a plurality of control instruments, one for each room in which control is to be effected, each such instrument communicating with the pressure-fluid system and provided with a leak-port and a valve for closing the leak-port, and with two like elements responsive to atmospheric changes, both such elements adapted to effect the seating and unseating of said valve in response to atmospheric changes; means whereby one of said elements of each instrument may at will be held out of or permitted to go into operative relation with the leak-port valve; an electromagnet associated with the last-named responsive element of each instrument and serving, when energized, to move and hold said element out of valve-closing action; an electric circuit including the electromagnets of the several instruments; polarized armatures, one for each instrument, each in position to be attracted by its associated electromagnet and to move away from the leak-port said last-mentioned responsive element; and means for briefly energizing said electromagnets.

3. In a control system of the character described, the combination of a pressure-fluid conduit communicating with a plurality of rooms; a plurality of control instruments, one for each room in which control is to be effected, each such instrument communicating with the pressure-fluid system and provided with a leak-port and a valve for closing the leak-port, and with two like elements responsive to atmospheric changes, both such elements adapted to effect the seating and unseating of said valve in response to atmospheric changes; means whereby one of said elements of each instrument may at will be held out of or permitted to go into operative relation with the leak-port valve; an electromagnet associated with the last-named responsive element of each instrument and serving, when energized, to move and hold said element out of valve-closing action; an electric circuit including the electromagnets of the several instruments; polarized armatures, one for each instrument, each in position to be attracted by its associated electromagnet and to move away from the leak-port said last-mentioned responsive element; and means for briefly directing current through the electromagnets in either direction at will.

4. A control system of the character described, comprising a plurality of instruments each communicating with a fluid-pressure system and provided with a leak-port and also communicating with the fluid-pressure motor of a valve serving, when said motor is inflated, to shut off the supply of the agent to be controlled; a valve for each instrument serving to seal and unseal said leak-port; two independent elements adapted upon change in atmospheric conditions to which the instrument is subjected, to act upon said valve to seal or unseal the leak-port; a stop device movable to and from a position to prevent one of said elements acting upon said leak-port valve; an electromagnet for each of said instruments operatively associated with one of said elements; an energizing circuit connecting said magnets; means for completing said circuit to energize said magnets; an armature for each of said magnets located within the field of attraction of its magnet and serving when the magnet is energized to move the responsive element with which it is associated, away from the leak-port valve and to leave said leak-port under control of the other responsive element.

5. A temperature control system of the character described, comprising a plurality of thermostats each having two thermo-sensitive elements; manually operable means at each thermostat for placing one of said elements in or out of service at will; an electromagnet associated with the last-mentioned element of each thermostat, serving when energized, to move and hold said element out of control position; an electric circuit embracing said magnets; and means for supplying electric current to said circuit to energize said magnets.

6. A temperature control system of the character described, comprising a plurality of thermostats each having two thermo-sensitive elements; manually operable means at each thermostat for placing one of said elements in or out of service at will; an electromagnet associated with the last-mentioned element of each thermostat; an electric circuit embracing all of said electro-magnets; an armature for each thermostat movable by its associated magnet in one or the other direction according to the direction of flow of its energizing current; and means for causing a flow of current through said magnets in either direction at will, said armature serving when moved in one direction to put its associated thermo-sensitive element out of service and when moved in the opposite direction to restore said service to each space in which said thermostats are located.

7. A temperature control system of the character described, comprising a plurality of thermostats each having two thermo-sensitive elements; an electro-magnet associated with one of said elements and serving, when energized, to move and hold said element out of control position; an electric circuit embracing said magnets; and means for supplying electric current to said circuit to energize said magnets.

8. A temperature control system comprising, in combination, a plurality of thermostats, each including two thermally responsive elements each capable of exerting temperature control; electromagnetic devices, one associated with each thermostat and each arranged, when actuated, to transfer control alternately from one to another responsive element; a selector adjacent each thermostat operable to confine control to one of said responsive elements regardless of the action of said electromagnetic device; a circuit including all of said electromagnetic devices; and means for energizing said circuit to actuate said electromagnetic devices.

In testimony whereof I have signed my name to this specification.

CHARLES L. FORTIER.